(12) United States Patent
Pang et al.

(10) Patent No.: US 12,115,761 B2
(45) Date of Patent: Oct. 15, 2024

(54) COFFEE STAIN-RESISTANT CELLULOSIC STRUCTURES AND ASSOCIATED CONTAINERS AND METHODS

(71) Applicant: WestRock MWV, LLC, Atlanta, GA (US)

(72) Inventors: Jiebin Pang, Glen Allen, VA (US); Steven Parker, Raleigh, NC (US); Natasha G. Melton, Richmond, VA (US)

(73) Assignee: WestRock MWV, LLC, Atlanta, GA (US)

( * ) Notice: Subject to any disclaimer, the term of this patent is extended or adjusted under 35 U.S.C. 154(b) by 81 days.

(21) Appl. No.: 17/156,798

(22) Filed: Jan. 25, 2021

(65) Prior Publication Data

US 2021/0276314 A1 Sep. 9, 2021

Related U.S. Application Data

(60) Provisional application No. 62/984,872, filed on Mar. 4, 2020.

(51) Int. Cl.
*B32B 27/10* (2006.01)
*B32B 27/20* (2006.01)
*B32B 27/30* (2006.01)

(52) U.S. Cl.
CPC ............. *B32B 27/10* (2013.01); *B32B 27/20* (2013.01); *B32B 27/306* (2013.01); *B32B 2250/03* (2013.01); *B32B 2250/04* (2013.01); *B32B 2255/12* (2013.01); *B32B 2255/26* (2013.01); *B32B 2255/28* (2013.01); *B32B 2307/4026* (2013.01); *B32B 2307/7265* (2013.01); *B32B 2307/728* (2013.01); *B32B 2439/02* (2013.01); *B32B 2439/62* (2013.01); *B32B 2439/70* (2013.01)

(58) Field of Classification Search
None
See application file for complete search history.

(56) References Cited

U.S. PATENT DOCUMENTS

| 2,290,633 A | 7/1942 | Cate |
| 5,529,834 A | 6/1996 | Tsai et al. |

(Continued)

FOREIGN PATENT DOCUMENTS

| CN | 109311299 A | 2/2019 |
| DE | 102017131277 A1 | 6/2019 |

(Continued)

OTHER PUBLICATIONS

International Search Report issued in corresponding Interantional Patent Application No. PCT/US2021/014844 on Jun. 5, 2021. (12 pages).

(Continued)

*Primary Examiner* — Tamra L. Dicus
(74) *Attorney, Agent, or Firm* — Neil G. Cohen

(57) ABSTRACT

A cellulosic structure including a cellulosic substrate comprising a first major side and a second major side opposed from the first major side, an oil barrier layer on the second major side of the cellulosic substrate, and a water barrier layer on the second major side of the cellulosic substrate, wherein the oil barrier layer is positioned between the cellulosic substrate and the water barrier layer.

17 Claims, 10 Drawing Sheets

(56) References Cited

U.S. PATENT DOCUMENTS

| | | | |
|---|---|---|---|
| 5,604,042 A | 2/1997 | Bianchini et al. | |
| 5,654,039 A | 8/1997 | Wenzel et al. | |
| 5,981,011 A * | 11/1999 | Overcash | D21H 19/84 |
| | | | 428/479.6 |
| 5,985,772 A | 11/1999 | Wood et al. | |
| 6,193,831 B1 | 2/2001 | Overcash et al. | |
| 6,387,500 B1 | 5/2002 | Behl | |
| 6,545,079 B1 | 4/2003 | Nurmi et al. | |
| 6,942,897 B2 | 9/2005 | Joyce et al. | |
| 7,235,308 B2 | 6/2007 | Druckrey et al. | |
| 7,320,825 B2 | 1/2008 | Morabito | |
| 7,452,573 B2 | 11/2008 | Fish et al. | |
| 7,833,915 B2 | 11/2010 | Propst, Jr. | |
| 8,178,180 B2 | 5/2012 | Penttinen et al. | |
| 8,642,146 B2 | 2/2014 | Fujimura et al. | |
| 9,028,921 B2 | 5/2015 | Dandenault et al. | |
| 9,200,409 B2 | 12/2015 | Hartmann et al. | |
| 9,732,474 B2 | 8/2017 | Koenig et al. | |
| 9,783,391 B2 | 10/2017 | Zerelles et al. | |
| 9,803,088 B2 | 10/2017 | Iyer et al. | |
| 9,828,523 B2 | 11/2017 | Johnson et al. | |
| 9,950,502 B2 | 4/2018 | Seyffer et al. | |
| 9,994,999 B2 | 6/2018 | Axrup et al. | |
| 10,081,168 B2 | 9/2018 | Nevalainen et al. | |
| 10,214,859 B2 | 2/2019 | Svending et al. | |
| 10,422,081 B2 | 9/2019 | Hayes et al. | |
| 10,494,768 B2 | 12/2019 | Schildknecht et al. | |
| 10,562,659 B2 | 2/2020 | Fortin et al. | |
| 10,590,606 B2 | 3/2020 | Mongrain et al. | |
| 10,689,531 B2 | 6/2020 | McJunkins et al. | |
| 10,829,894 B2 * | 11/2020 | Mongrain | D21H 19/72 |
| 11,504,952 B2 * | 11/2022 | Noda | D21H 19/58 |
| 2003/0085012 A1 | 5/2003 | Jones et al. | |
| 2004/0121079 A1 * | 6/2004 | Urscheler | D21H 19/82 |
| | | | 427/420 |
| 2004/0241475 A1 | 12/2004 | Morabito | |
| 2005/0037162 A1 | 2/2005 | Adams | |
| 2007/0232743 A1 | 10/2007 | Laviolette et al. | |
| 2011/0046284 A1 | 2/2011 | Berube et al. | |
| 2011/0132975 A1 | 6/2011 | Toft et al. | |
| 2011/0138753 A1 | 6/2011 | Justice et al. | |
| 2011/0206914 A1 | 8/2011 | Hartmann et al. | |
| 2011/0262745 A1 | 10/2011 | Ronka | |
| 2013/0017349 A1 | 1/2013 | Heiskanen et al. | |
| 2013/0022817 A1 | 1/2013 | Neal et al. | |
| 2013/0330527 A1 * | 12/2013 | Hartmann | D21H 19/82 |
| | | | 427/372.2 |
| 2015/0111011 A1 * | 4/2015 | Hoekstra | D21H 19/22 |
| | | | 428/207 |
| 2015/0344729 A1 | 12/2015 | Breese et al. | |
| 2016/0153149 A1 * | 6/2016 | Mongrain | D21H 19/22 |
| | | | 428/512 |
| 2017/0211237 A1 | 7/2017 | Schildknecht et al. | |
| 2018/0135252 A1 * | 5/2018 | Pang | D21H 27/10 |
| 2018/0142418 A1 | 5/2018 | Sundholm et al. | |
| 2018/0355204 A1 * | 12/2018 | Turkki | C08F 212/08 |
| 2019/0002725 A1 | 1/2019 | Zischka et al. | |
| 2019/0291134 A1 | 9/2019 | Mongrain | |
| 2019/0352854 A1 * | 11/2019 | Backfolk | D21H 21/52 |
| 2020/0087860 A1 | 3/2020 | Morikawa et al. | |
| 2020/0131708 A1 | 4/2020 | Triclot et al. | |
| 2020/0255676 A1 | 8/2020 | Luyten et al. | |
| 2020/0361196 A1 | 11/2020 | Meizanis et al. | |
| 2020/0370244 A1 | 11/2020 | Becker et al. | |
| 2021/0002828 A1 | 1/2021 | Grundl et al. | |
| 2021/0017714 A1 | 1/2021 | Mongrain | |
| 2021/0017717 A1 | 1/2021 | Backfolk et al. | |
| 2021/0025114 A1 | 1/2021 | Mongrain et al. | |
| 2021/0206150 A1 * | 7/2021 | Azerraf | B32B 7/12 |

FOREIGN PATENT DOCUMENTS

| | | |
|---|---|---|
| EP | 3461637 A1 | 4/2019 |
| WO | 2019/199491 A1 | 10/2019 |
| WO | 2020/152635 A1 | 7/2020 |

OTHER PUBLICATIONS

"Paper and Paperboard Converting", Jurkka Kuusipalo, China Light Industry Press, 2017.06, p. 178.

Chinese Office Action dated May 14, 2024.

* cited by examiner

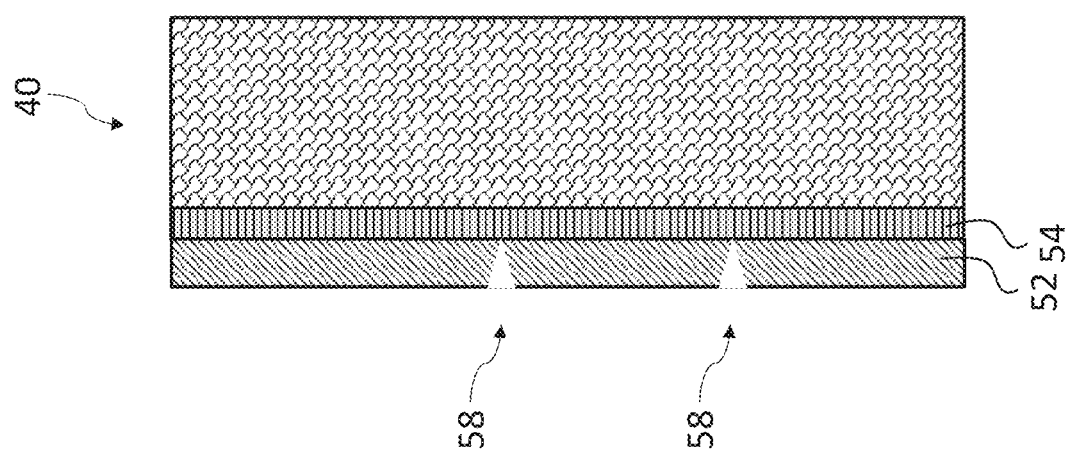

COFFEE STAIN-RESISTANT CELLULOSIC STRUCTURES AND ASSOCIATED CONTAINERS AND METHODS

PRIORITY

This application claims priority from U.S. Ser. No. 62/984,872 filed on Mar. 4, 2020.

FIELD

This application is directed to cellulosic structures and, more particularly, to coffee-stain resistant cellulosic structures.

BACKGROUND

Cellulosic structures are used in various packaging applications. For example, coated unbleached paperboard is used to package beverage containers, frozen foods, cereals and a wide variety of other food and non-food consumer goods. Other forms of coated cellulosic structures are used for a variety of packaging options in food service and consumer products.

Sustainability is one of the key drivers in development of new packages for food or food service applications. Cellulosic structures with low-density polyethylene (LDPE) extrusion coating are one of the dominant materials for food service packages, especially paper cups, which after use however are not easily recyclable, causing more and more concerns on environmental impact. Cellulosic structures coated with aqueous coatings are generally considered repulpable and recyclable, and thus more sustainable. However, paper cups made of aqueous coated cellulosic structures do not perform at the same level as cups made of LDPE coated cups. One of the technical challenges is that the aqueous coated cup bottom usually shows cracking, coffee staining, and even leaking for the worst case, along the fold edge of the cup bottom.

Accordingly, those skilled in the art continue with research and development efforts in the field of cellulosic structures.

SUMMARY

Disclosed are cellulosic structures having a water barrier layer and an oil barrier layer.

In one example, the disclosed cellulosic structure includes a cellulosic substrate having a first major side and a second major side opposed from the first major side, an oil barrier layer on the second major side of the cellulosic substrate and a water barrier layer on the second major side of the cellulosic substrate, wherein the oil barrier layer is positioned between the cellulosic substrate and the water barrier layer.

Also disclosed are containers, such as cups, manufactured from the disclosed cellulosic structures.

In one example, the disclosed container includes a side wall having an upper end portion and a lower end portion, and a bottom wall connected to the lower end portion of the side wall, wherein at least the bottom wall includes a cellulosic structure that includes a cellulosic substrate, an oil barrier layer on the cellulosic substrate, and a water barrier layer positioned over the oil barrier layer.

Also disclosed are methods for manufacturing cellulosic structures having both oil and water barrier properties.

In one example, the disclosed method for manufacturing a cellulosic structure includes steps of (1) applying an oil barrier coating formulation to a cellulosic substrate to form an oil barrier layer, the oil barrier coating formulation including at least one of polyvinyl alcohol, carboxymethylcellulose, alginate, and microfibrillated cellulose, and (2) applying a water barrier coating formulation over the oil barrier layer to form a water barrier layer, wherein the oil barrier layer is positioned between water barrier layer and the cellulosic substrate.

Other examples of the disclosed coffee-stain resistant cellulosic structures and associated containers and methods will become apparent from the following detailed description, the accompanying drawings and the appended claims.

BRIEF DESCRIPTION OF THE DRAWINGS

FIG. 6 is a schematic cross-sectional view of another example of the disclosed cellulosic structure;

DETAILED DESCRIPTION

Disclosed are cellulosic structures and associated containers that are significantly less susceptible to staining upon contact with food and beverages, particularly coffee and tea, as compared to traditional aqueous-coated cellulosic structures and associated containers.

The disclosed cellulosic structures can be manufactured by positioning an oil barrier layer on (e.g., directly adjacent) a major side of a cellulosic substrate, and then applying a water barrier layer over (e.g., directly adjacent) the oil barrier layer such that the oil barrier layer is positioned between the cellulosic substrate and the water barrier layer. Such a combination of barrier layers may function to minimize the cup bottom fold-edge cracking, staining, or even leaking of cups made of aqueous coated cellulosic material. Therefore, containers manufactured from the disclosed cellulosic structures may be particularly well-suited for holding hot beverages (e.g., coffee), hot foodstuffs (e.g., soup), bundle wraps, and flexible type packaging.

Figure 1:
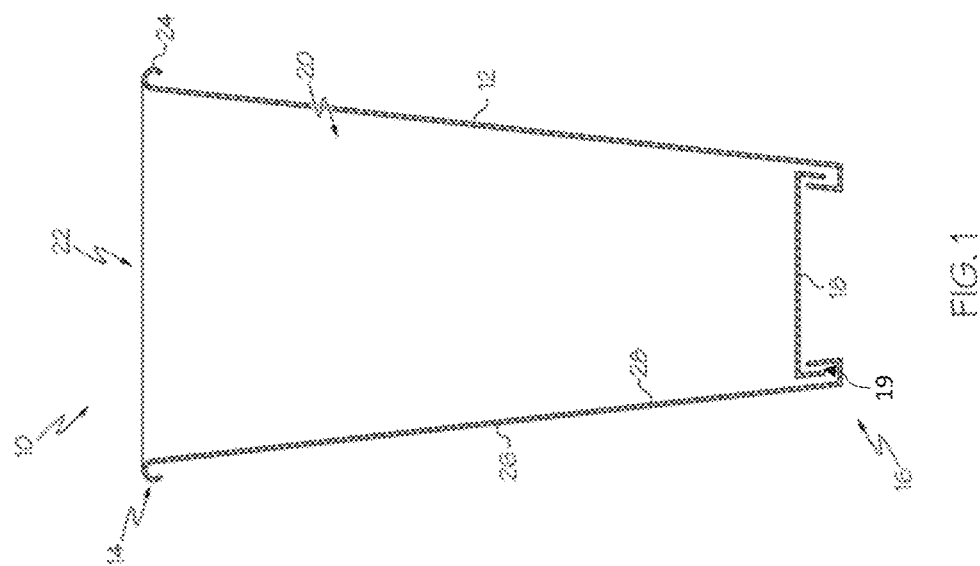
FIG. 1 is an elevational view, in section, of one example of a container (e.g., a cup) that can be manufactured using the disclosed cellulosic structures.
Figure 2:
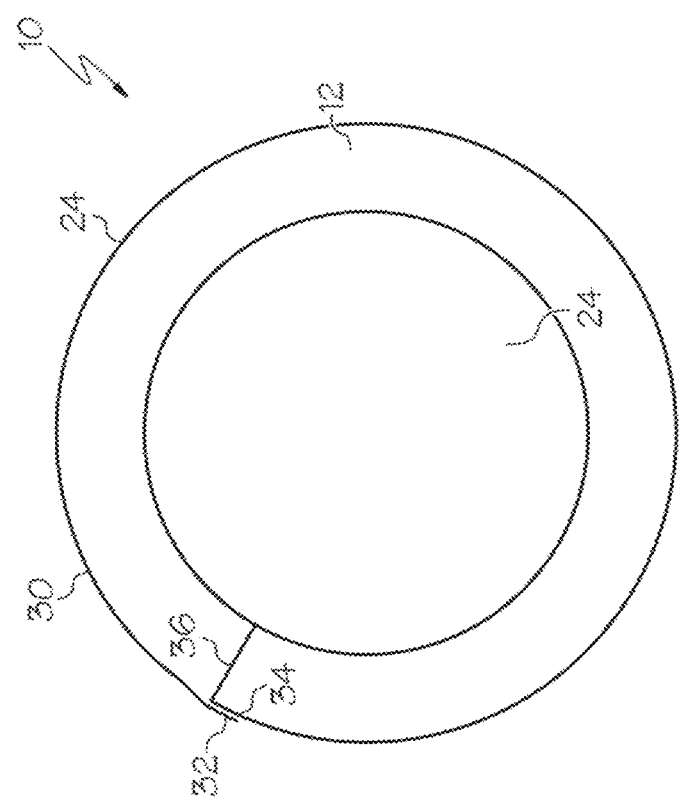
FIG. 2 is a top plan view of the container of FIG. 1.

Referring to FIGS. 1 and 2, one example of a disclosed cellulosic-based container, generally designated 10, may include a side wall 12 having an upper end portion 14 and a lower end portion 16, and a bottom wall 18 connected (e.g., heat-sealed) to the lower end portion 16 of the side wall 12, thereby defining an internal volume 20 within the container 10. The upper end portion 14 of the side wall 12 may define an opening 22 into the internal volume 20. Optionally, the upper end portion 14 of the side wall 12 may additionally include a lip 24 (e.g., a rolled lip), such as for securing a lid (not shown) or the like to the container 10.

While the container 10 is shown in FIG. 1 as a tall cup (e.g., a 12-ounce, 16-ounce, 21-ounce or 24-ounce disposable take-out cup) having a frustoconical side wall 12, those skilled in the art will appreciate that the disclosed container 10 may be manufactured in various shapes, sizes and configurations, and may be manufactured with fewer or more walls than the side wall 12 and bottom wall 18 discussed above, without departing from the scope of the present disclosure.

Figure 3:
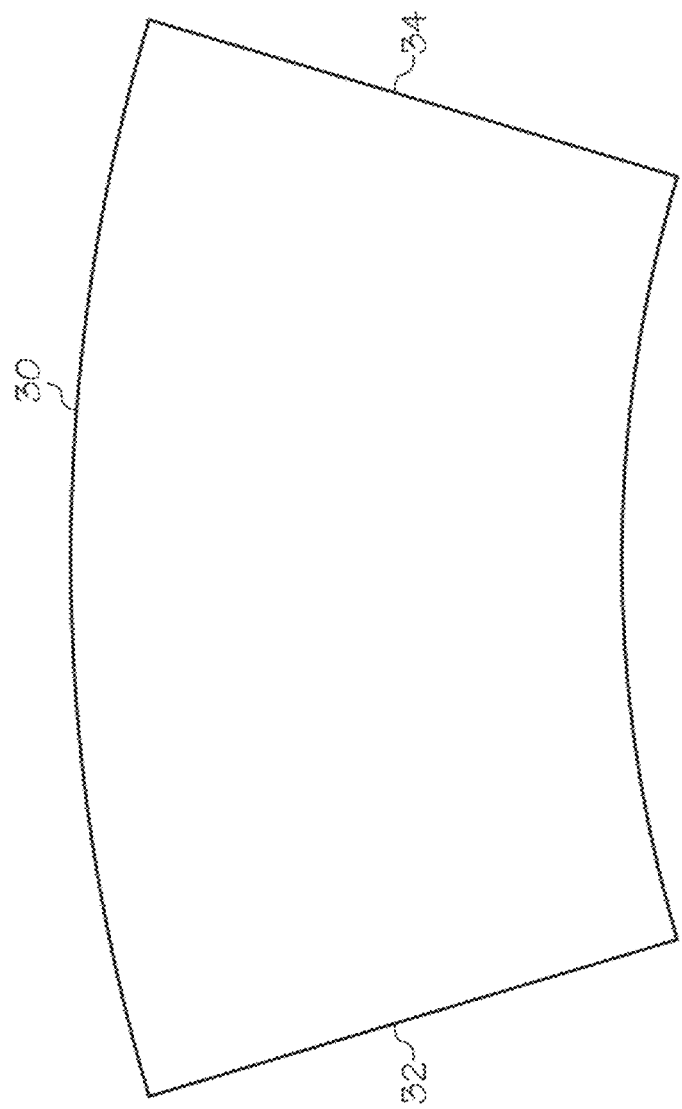
FIG. 3 is a plan view of a die-cut blank that may be wrapped around a mandrel to form the side wall of the container of FIG. 1.

As shown in FIG. 2, the side wall 12 of the container 10 may be assembled from a blank 30 (FIG. 3) that has been cut to the desired silhouette and then wrapped around a mandrel (not shown). While the blank 30 is wrapped around the mandrel, the first end 32 of the blank 30 overlaps a second end 34 of the blank 30, and the overlapping ends 32, 34 may be connected (e.g., by heat-sealing), thereby defining a seam 36 that extends from the upper end portion 14 to the lower end portion 16 of the side wall 12. Once the side wall 12 has been assembled, the bottom wall 18 may be connected (e.g., heat-sealed) to the lower end portion 16 of the side wall 12, creating a fold edge 19, thereby yielding the container 10.

Figure 4:
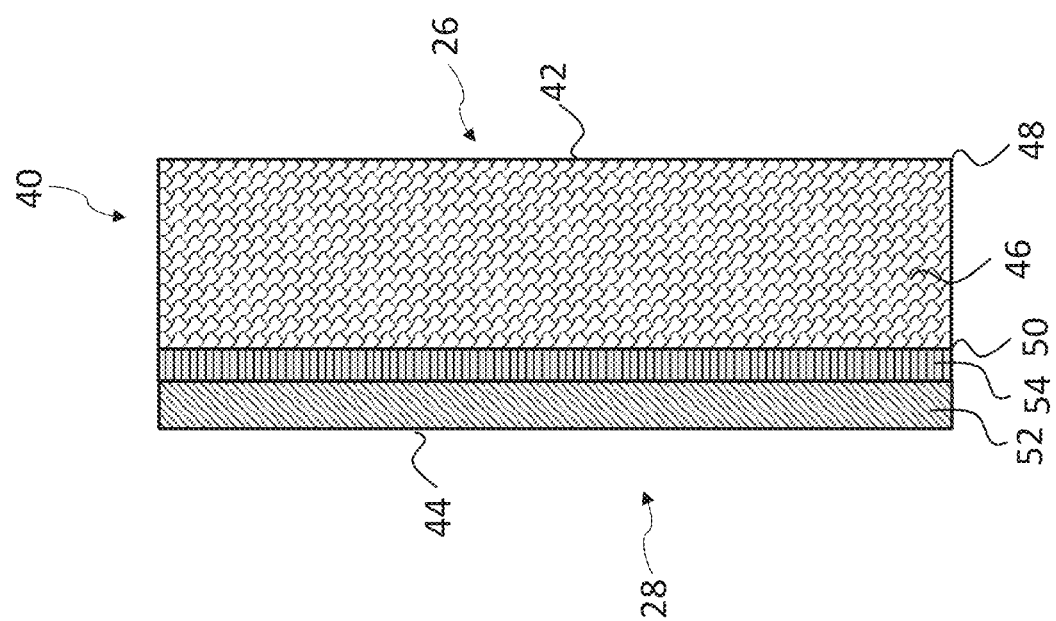
FIG. 4 is a schematic cross-sectional view of one example of the disclosed cellulosic structure.

Referring to FIG. 4, the bottom wall 18 of the container 10 may be manufactured from a cellulosic structure 40 having a first major surface 42 and a second major surface 44. The first major surface 42 of the cellulosic structure 40 may correspond to the exterior surface 26 of the container 10. The second major surface 44 of the cellulosic structure 40 may correspond to the interior surface 28 of the container 10.

The cellulosic structure 40 may be a layered structure that includes a cellulosic substrate 46 having a first major side 48 and a second major side 50. A water barrier layer 52 and an oil barrier layer 54 may be applied to a major side (e.g., the second major side 50) of the cellulosic substrate 46 such that the oil barrier layer 54 may be positioned between the water barrier layer 52 and the cellulosic substrate 46. The water barrier layer 52 may define a major surface (e.g., the second major surface 44) of the cellulosic structure 40 and, thus, the interior surface 28 of the container 10.

Figure 5:
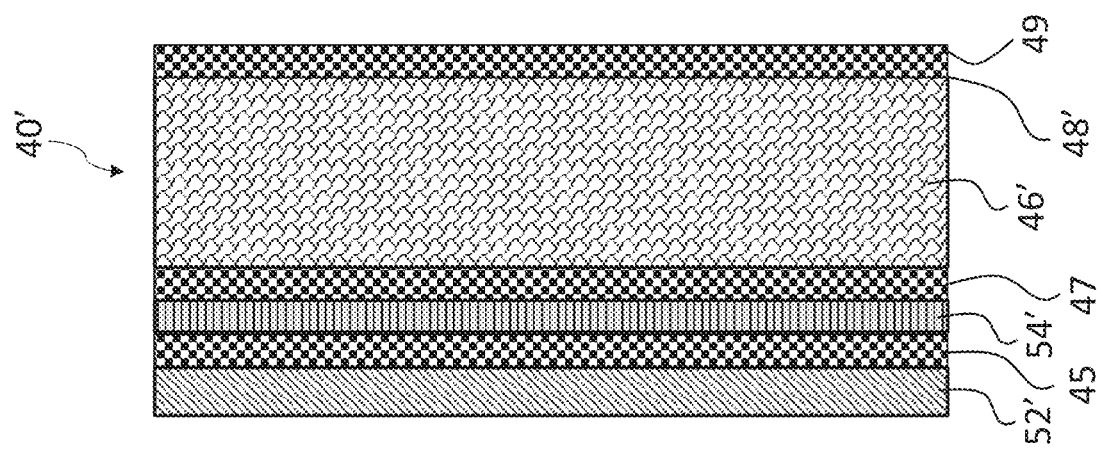
FIG. 5 is a schematic cross-sectional view of another example of the disclosed cellulosic structure.

At this point, those skilled in the art will appreciate that various additional coating layers, barrier or non-barrier, may be incorporated into the cellulosic structure 40 on top of the second major side 50 between the cellulosic substrate 46 and the oil barrier layer 54, between the oil barrier layer 54 and the water barrier layer 52, or on the first major side 48 of the cellulosic substrate 46 without departing from the scope of the present disclosure. In one variation, as shown in FIG. 5, the cellulosic structure 40' may include a basecoat 45 between the water barrier layer 52' and the oil barrier layer 54'. In another variation, as shown in FIG. 5, the cellulosic structure 40' may include a basecoat 47 between the oil barrier layer 54' and the cellulosic substrate 46'. In another variation, as shown in FIG. 5, the cellulosic structure 40' may include a basecoat 49 (barrier or non-barrier, one layer or multiple layers) on the first major side 48' of the cellulosic substrate 46'. In yet another variation, as shown in FIG. 5, the cellulosic structure 40' may include a first basecoat 45 between the water barrier layer 52' and the oil barrier layer 54', and a second basecoat 47 between the oil barrier layer 54' and the cellulosic substrate 46'. In another variation, as shown in FIG. 5, the cellulosic structure 40' may include a first basecoat 45 between water barrier layer 52' and the oil barrier layer 54', a second basecoat 47 between the oil barrier layer 54' and the cellulosic substrate 46', and a third basecoat 49 on the first major side 48' of the cellulosic substrate 46'. Other combinations, variation of composition, and additional basecoat layers are contemplated without departing from the scope of the invention.

Referring to FIG. 6, the cellulosic structure 40 may develop microcracks 58 in the water barrier layer 52 during formation of the container 10. Although the microcracks 58 may form down to the oil barrier layer 54, the oil barrier layer 54 may remain intact. The microcracks 58 in the water barrier layer 52 may not result in loss in functionality of the water barrier layer 52 nor in the oil barrier layer 54. In other words, the microcracks 58 in the water barrier layer 52 may be small enough to still hold out water; however, more aggressive molecules such as coffee oils and/or additives may penetrate the microcracks, then the oil barrier layer 54 may prevent the coffee oils and/or additives from staining the fiber substrate.

Referring back to FIG. 4, the cellulosic substrate 46 of the cellulosic structure 40 may be (or may include) any cellulosic material that is capable of being coated with the water barrier layer 52 and the oil barrier layer 54. Those skilled in the art will appreciate that the cellulosic substrate 46 may be bleached or unbleached. In one nonlimiting example the cellulosic substrate may be paperboard. In another nonlimiting example the cellulosic substrate may be solid bleached sulfate (SBS). Examples of appropriate cellulosic substrates include paper, corrugating medium, linerboard, and unbleached kraft.

The cellulosic substrate 46 may have an uncoated basis weight of at least about 25 pounds per 3000 $ft^2$. In one expression, the cellulosic substrate 46 may have an uncoated basis weight ranging from about 40 pounds per 3000 $ft^2$ to about 400 pounds per 3000 $ft^2$. In another expression, the cellulosic substrate 46 may have an uncoated basis weight ranging from about 60 pounds per 3000 $ft^2$ to about 400 pounds per 3000 $ft^2$. In another expression, the cellulosic substrate 46 may have an uncoated basis weight ranging from about 80 pounds per 3000 $ft^2$ to about 300 pounds per 3000 $ft^2$. In another expression the cellulosic substrate 46 may have an uncoated basis weight ranging from about 90 pounds per 3000 $ft^2$ to about 250 pounds per 3000 $ft^2$. In yet another expression the cellulosic substrate 46 may have an uncoated basis weight ranging from about 100 pounds per 3000 $ft^2$ to about 200 pounds per 3000 $ft^2$.

Furthermore, the cellulosic substrate 46 may have a caliper (thickness) ranging, for example, from about 2 points to about 30 points (0.002 inch to 0.030 inch). In one expression, the caliper range is from about 8 points to about 24 points. In another expression, the caliper range is from about 12 points to about 20 points.

One specific, nonlimiting example of a suitable cellulosic substrate 46 is 13-point, 150 pounds per 3000 $ft^2$ SBS TruServ™ cupstock manufactured by WestRock Company of Atlanta, Georgia. Another specific, nonlimiting example of a suitable cellulosic substrate 46 is 18-point, 185 pounds per 3000 $ft^2$ SBS TruServ™ cupstock manufactured by WestRock Company.

Referring back to FIG. 4, the water barrier layer 52 is positioned over the oil barrier layer 54. Various techniques may be used for forming the water barrier layer 52 over the oil barrier layer 54, such as one or more coaters either on the paper machine or as off-machine coater(s). When heated, a heat-seal coating provides an adhesion to other regions of product with which it contacts. One specific, nonlimiting example of a suitable method is using a blade coater for applying the water barrier layer 52.

The water barrier layer 52 may be applied to the cellulosic substrate 46 at various coat weights, on a dry basis. In one expression, the water barrier layer 52 may be applied at a coat weight of at least about 4 pounds per 3,000 ft$^2$, as dried. In another expression, the water barrier layer 52 may be applied at a coat weight of about 4 pounds per 3,000 ft$^2$ to about 20 pounds per 3,000 ft$^2$, as dried. In another expression, the water barrier layer 52 may be applied at a coat weight of about 6 pounds per 3,000 ft$^2$ to about 16 pounds per 3,000 ft$^2$, as dried. In yet another expression, the water barrier layer 52 may be applied at a coat weight of about 8 pounds per 3,000 ft$^2$ to about 12 pounds per 3,000 ft$^2$, as dried.

The water barrier layer 52 may include a binder and a pigment. The water barrier layer 52 may include a single layer or may include at least two layers without departing from the scope of the present invention. In one expression, the ratio of the pigment to the binder may be at most 1 part (by weight) pigment per 1 part (by weight) binder. In another expression, the ratio of the pigment to the binder may be about 1:1 to about 1:9 by weight. In another expression, the ratio of the pigment to the binder can be about 1:1.5 to about 1:6 by weight. In yet another expression, the ratio of the pigment to the binder can be about 1:2 to about 1:4 by weight.

In one particular implementation, the binder of the water barrier layer 52 may be an aqueous binder. As one general, nonlimiting example, the binder may be a latex. As another general, nonlimiting example, the binder may be a water-based acrylic polymer emulsion having a glass transition temperature ranging from about 25° C. to about 50° C. (e.g., from about 28° C. to about 32° C.). A specific, nonlimiting example of a suitable binder is presented in Table 2. Other aqueous binders are also contemplated, such as styrene-butadiene rubber (SBR), ethylene acrylic acid (EAA), polyvinyl acetate (PVAC), polyvinyl acrylic, polyester dispersion, and combinations thereof.

The pigment component of the water barrier layer 52 may be (or may include) various materials. Two nonlimiting examples of suitable inorganic pigments are presented in Table 1. Other pigments, such as plastic pigments, titanium dioxide pigment, talc pigment and the like, may be used without departing from the scope of the present disclosure.

In one variation, the pigment component of the water barrier layer 52 may be a clay pigment. As one example, the clay pigment may be platy clay, such as a high aspect ratio platy clay (e.g., an average aspect ratio of at least 40:1, such as an average aspect ratio of at least 60:1). As another example, the clay pigment may be platy clay, such as a high aspect ratio platy clay (e.g., an average aspect ratio of at least 30:1, such as an average aspect ratio of at least 50:1). As yet another example, the clay pigment may be platy clay, such as a high aspect ratio platy clay (e.g. an average aspect ratio of at least 20:1, such as an average aspect ratio of at least 25:1).

In another variation, the pigment component of the water barrier layer 52 may be a calcium carbonate (CaCO$_3$) pigment. As one example, the CaCO$_3$ pigment may be a coarse ground calcium carbonate with a particle size distribution wherein about 60 percent of the particles are less than 2 microns.

In yet another variation, the pigment component of the water barrier layer 52 may be a pigment blend that includes both calcium carbonate pigment and clay pigment.

Referring back to FIG. 4, the oil barrier layer 54 may be applied to the cellulosic substrate 46, such as to the second major side 50 of the cellulosic substrate 46. The oil barrier layer 54 may be applied to the second major side 50 of the cellulosic substrate 46 using any suitable method, such as one or more coaters either on the paper machine or as off-machine coater(s). One specific, nonlimiting example of a suitable method is using a rod coater using rod #040 for applying the oil barrier layer 54.

The oil barrier layer 54 may be hydrophilic or water soluble, and may include one or more polymers. In one expression, the oil barrier layer 54 may include polyvinyl alcohol (PVOH). One specific, nonlimiting example of a suitable PVOH is Exceval™ HR-3010, a modified PVOH resin, supplied by Kuraray America Incorporated of Houston, Texas. In another expression, the oil barrier layer 54 may include carboxymethylcellulose (CMC). In another expression, the oil barrier layer 54 may include sodium (Na) carboxymethylcellulose. One specific, nonlimiting example of the sodium carboxymethylcellulose is Finnfix® BBP H15S, a purified low viscous sodium carboxymethylcellulose, supplied by CP Kelco U.S. Incorporated of Atlanta, Georgia. In another expression, the oil barrier layer 54 may include alginate. In yet another expression, the oil barrier layer 54 may include microfibrillated cellulose (MFC). Other water-soluble polymers are also contemplated, such as protein, hydroxypropyl methylcellulose (HPMC), hydroxyethyl cellulose (HEC), polyacrylic acid (PAA), polyvinyl pyrrolidone (PVP), polyethylene glycol (PEG) and combinations thereof.

The oil barrier layer 54 may be applied to the cellulosic substrate 46 at various coat weights, on a dry basis. In one expression, the oil barrier layer 54 may be applied at a coat weight of at least about 0.5 pounds per 3,000 ft$^2$, as dried. In another expression, the oil barrier layer 54 may be applied at a coat weight of about 0.5 pounds per 3,000 ft$^2$ to about 4.0 pounds per 3,000 ft$^2$, as dried. In another expression, the oil barrier layer 54 may be applied at a coat weight of about 1.0 pounds per 3,000 ft$^2$ to about 3.0 pounds per 3,000 ft$^2$, as dried. In another expression, the oil barrier layer 54 may be applied at a coat weight of about 1.5 pounds per 3,000 ft$^2$ to about 2.5 pounds per 3,000 ft$^2$, as dried. In yet another expression, the oil barrier layer 54 may be applied at a coat weight of about 0.5 pounds per 3,000 ft$^2$ to about 2.0 pounds per 3,000 ft$^2$, as dried.

The oil barrier layer 54 may further comprise a pigment. The pigment component of the oil barrier layer 54 may be (or may include) various materials. Two nonlimiting examples of suitable inorganic pigments are presented in Table 1. Other pigments, such as plastic pigments, titanium dioxide pigment, talc pigment and the like, may be used without departing from the scope of the present disclosure.

In one variation, the pigment component of the oil barrier layer 54 may be a clay pigment. As one example, the clay pigment may be platy clay, such as a high aspect ratio platy clay (e.g., an average aspect ratio of at least 40:1, such as an average aspect ratio of at least 60:1). As another example, the clay pigment may be platy clay, such as a high aspect ratio platy clay (e.g., an average aspect ratio of at least 30:1, such as an average aspect ratio of at least 50:1). As yet another example, the clay pigment may be platy clay, such as a high aspect ratio platy clay (e.g. an average aspect ratio of at least 20:1, such as an average aspect ratio of at least 25:1). Other suitable clays include, but are not limited to, kaolin, bentonite, calcined clays and the like.

In another variation, the pigment component of the oil barrier layer 54 may be a calcium carbonate ($CaCO_3$) pigment. As one example, the $CaCO_3$ pigment may be a coarse ground $CaCO_3$ with a particle size distribution wherein about 60 percent of the particles are less than 2 microns.

In yet another variation, the pigment component of the oil barrier layer 54 may be a pigment blend that includes both calcium carbonate pigment and clay pigment.

Referring back to FIG. 1, the side wall 12 of the container 10 may also be manufactured from a cellulosic structure, such as the cellulosic structure 40 shown in FIG. 4 or the cellulosic structure 40' shown in FIG. 5. However, various other cellulosic structures may be used to form the side wall 12, such as when printability of the side wall 12 is of little or no concern.

EXAMPLES

Experiments were conducted to evaluate the use of a water barrier layer over an oil barrier layer in connection with a paperboard structure. One water barrier coating formulation (BC-1) and two oil barrier coating formulations (PVOH and CMC) were prepared and used in the experiments. The pigments used in the water barrier layer are presented in Table 1. The binder used in the water barrier layer is presented in Table 2. The water barrier coating formulation (BC-1) is presented in Table 3. The polymers used in the oil barrier coating formulations are presented in Table 4.

TABLE 1

| Name | Pigment | Description |
|------|---------|-------------|
| CL-1 | BARRISURF ™ XP (IMERYS Kaolin, Georgia) | Platy clay with high aspect ratio |
| CC-1 | HYDROCARB ® 60 (Omya AG of Oftringen, Switzerland) | Coarse ground $CaCO_3$ (particle size 60% < 2 microns) |

TABLE 2

| Name | Binder | Description |
|------|--------|-------------|
| SA-1 | CARTASEAL ® SCR (Archroma, Reinach, Switzerland) | Water based acrylic emulsion polymer, $T_g$ of 30° C. |

TABLE 3

| Water Barrier Coating Formulation (in Parts) | |
|---|---|
| | BC-1 |
| $CaCO_3$ (CC-1) | 65 |
| Clay (CL-1) | 35 |
| Binder (SA-1) | 250 |

TABLE 4

| Name | Polymer | Description |
|------|---------|-------------|
| PVOH | Exceval ™ HR-3010 (Kuraray America Inc., Houston, TX) | Modified polyvinyl alcohol resin |
| Na CMC | Finnfix ® BBP H15S (CP Kelco U.S. Inc., Atlanta, GA) | Purified low viscous sodium carboxymethylcellulose |

The water barrier coating formulation was prepared by standard mixing methods wherein the pigment slurries (for example, CC-1, CL-1) were first mixed while being agitated to form a homogeneous mixture. The binder (for example, SA-1) was then added into the pigments slurry also via agitation, yielding the water barrier coating formulation.

The PVOH solution was prepared by first dispersing the resin powder into water at room temperature under stirring. Then, the temperature of the mixture was raised by steam to 90-95° C. and was maintained under mixing for about 30 minutes. The solution was then cooled to room temperature and any foam that floated to the top of the solution was removed. The solids content of the solution was 10.1% measured by a CEM SMART 6 moisture analyzer, and viscosity of the solution was 318.8 cP (centipoise) measured by a Brookfield DV2T Viscometer at 100 rpm using a #2 spindle.

The Na CMC solution was prepared by slowly adding the Na CMC powder to water adjusted to 140° F. The solution was ready after being mixed for 30 minutes. The solids content of the solution was 13.1% measured by a CEM SMART 6 moisture analyzer, and the viscosity of the solution was 1250 cP measured by a Brookfield DV2T Viscometer at 100 rpm using a #2 spindle.

The PVOH and Na CMC solutions were applied at various coat weights, forming the oil barrier layer, to 13-point SBS Truserv™ cupstock having a basis weight of 150 pounds per 3000 ft$^2$. A rod coater using a rod #040 was used to apply the oil barrier coating formulation to the felt side of the paperboard substrate. A water barrier (1-layer or 2-layers) formulation was then applied over the oil barrier layer using a blade coater to form the water barrier layer, thereby yielding sample cup bottoms. Control cups had only a water barrier (1-layer or 2-layers) applied at various coat weights via a blade coater to 13-point SBS Truserv™ cupstock having a basis weight of 150 pounds per 3000 ft$^2$. The cups were made on a PMC (Paper Machinery Corporation) cup machine, model PMC-1250, by using side wall for the cup. All side walls of the cups used in the experiments were an 18-point SBS Truserv™ cupstock having a basis weight of 150 pounds per 3000 ft$^2$. The side walls were coated with a water barrier (2-layer). The examples and experimental results (Water Cobb and Coffee Cobb) are shown in Table 5.

TABLE 5

| Sample ID | SW (Side Wall) | BS (Bottom Stock)-Control | BS-1 | BS-2 | BS-3 |
|-----------|----------------|---------------------------|------|------|------|
| Substrate | 18 pt, 185 lb/3000 ft$^2$ TruServ™ Cupstock | 13 pt, 150 lb/3000 ft$^2$, TruServ™ Cupstock | | | |

TABLE 5-continued

| Sample ID | SW (Side Wall) | BS (Bottom Stock)-Control | BS-1 | BS-2 | BS-3 |
|---|---|---|---|---|---|
| Oil Barrier Coat | none | none | PVOH | PVOH | Na CMC |
| Oil Barrier Coat Weight (lb/3000 ft$^2$) | | | 1.7 | 1.7 | 2.2 |
| Water Barrier Coat | BC-1 | BC-1 | BC-1 | BC-1 | BC-1 |
| Water Barrier Coat Weight (lb/3000 ft$^2$) | 8.2 + 2.1 (2-layer) | 9.2 + 3.9 (2-layer) | 10 | 9.7 + 4.3 (2-layer) | 9.9 |
| H$_2$O Cobb (g/m$^2$-30 min) | 3.1 | 4 | 5.5 | 3.9 | 95 |
| Coffee Cobb (g/m2-30 min) | 8.3 | 8.9 | 12.3 | 8.2 | |

Thus, placing a water barrier layer over an oil barrier layer on a paperboard substrate provides a barrier that is capable of absorbing and repelling about the same amount of water and coffee as the cup bottoms without an oil barrier layer. The examples also exhibited excellent barrier properties, as evidenced by the 30-minute-water-Cobb results measured according to TAPPI Standard T441 om-04. For most cases, the additional oil barrier layer improved or at least maintained the water barrier properties of the paperboard structure. All examples (with the exception of the Na CMC example) had 30-minute-water-Cobb ratings of less than 10 g/m$^2$, with one below 4 g/m$^2$.

A hot coffee variant of the Cobb test was also utilized to evaluate the water barrier of the examples shown in Table 5. This test was performed by substituting 23° C. water with 90° C. coffee but otherwise complying TAPPI Standard T441 om-04. The coffee used was obtained by brewing 36 g of Starbucks medium house blend ground coffee with 1100 mL of distilled water in a 12 cup Mr. Coffee coffee maker. The coffee was then poured into a beaker with a magnetic stir bar and heated to 90° C. while being stirred at 55 rpm. If testing coffee with Rich's creamer, 37 mL of Rich's creamer was mixed into the coffee for 3 minutes. Coffee was then poured into cups to a level 5 mm below the rim of the cup. After a 30-minute hold, the coffee was removed from the cups and rinsed with distilled water. The empty cups were then immediately evaluated for leakage, staining, or damage. All of the examples shown in Table 5 had a 90° C. coffee Cobb rating of less than 15 g/m$^2$ after 30 minutes, with most less than 10 g/m$^2$ after 30 minutes.

Photographs were taken of the examples used in Table 5 to evaluate the amount of staining immediately after the coffee or coffee and creamer treatment. The bottom stock examples were bottom stock control (BS-control), a bottom stock including one layer of PVOH and one layer of water barrier coating (BS-1), a bottom stock including one layer of PVOH and two layers of water barrier coating (BS-2), or a bottom stock including one layer of CMC and one layer of water barrier coating (BS-3). Cup examples are provided in Table 6.

TABLE 6

| Cup Sample ID | Control | 1 | 2 | 3 |
|---|---|---|---|---|
| Side Wall | SW | SW | SW | SW |
| Bottom Stock | BS-Control | BS-1 | BS-2 | BS-3 |

Figure 7:
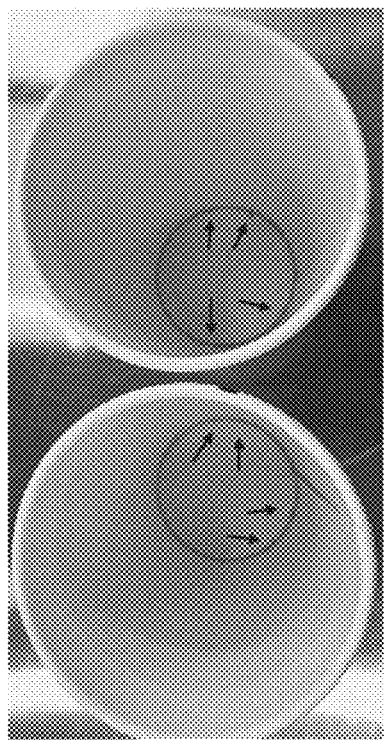
FIG. 7 is a photograph of two control cups having cup bottoms comprising a water barrier (2-layer) coated paperboard.

Referring to FIG. 7, a photograph was taken to show two BS-control cups having cup bottoms comprising a water barrier (2-layer) coated paperboard without an oil barrier layer. These cups were tested using only hot coffee. Several coffee staining spots along the fold edge of the cup bottom due to water barrier layer microcracks, indicated by the arrows. Most of the staining spots are noticeable from the outside of the cup (not shown).

Figure 8:
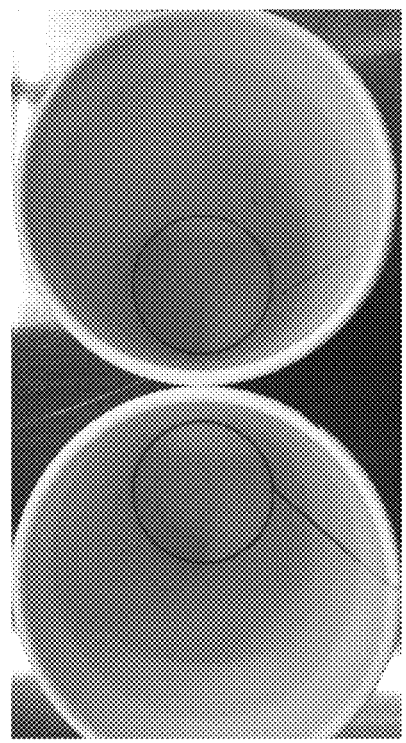
FIG. 8 is a photograph of two example cups having cup bottoms comprising a water barrier (1-layer) and an oil barrier layer coated paperboard.

Referring to FIG. 8, a photograph was taken to show two cups having BS-1 cup bottoms comprising a water barrier (1-layer) over a PVOH oil barrier layer on a paperboard substrate. These cups were tested using only hot coffee. There are zero coffee staining spots along the fold edge of the cup bottom.

Figure 9:
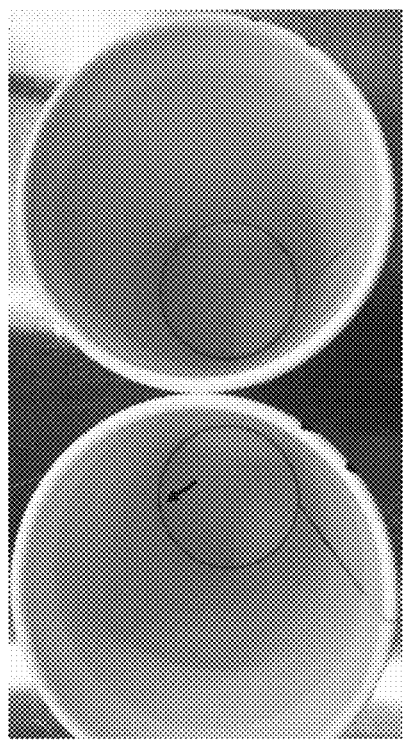
FIG. 9 is a photograph of two example cups having cup bottoms comprising a water barrier (2-layer) and an oil barrier layer coated paperboard.

Referring to FIG. 9, a photograph was taken to show two BS-2 cups having cup bottoms comprising a water barrier (2-layer) over a PVOH oil barrier layer coated paperboard. These cups were tested using only hot coffee. There were almost no (1 stain spot found indicated by the black arrow) coffee staining spots along the fold edge of the cup bottom. The two BS-control cups (FIG. 7) exhibited multiple (about five) coffee stains when there is no oil barrier layer present, whereas cups containing a PVOH oil barrier layer (FIGS. 8 & 9) exhibited only one stain over a sample size of four cups. FIGS. 7, 8, and 9 taken together demonstrate that even if the water barrier layer does exhibit microcracks, the oil layer barrier can still prevent coffee oil and/or additives from reaching and thus staining the cellulosic fiber substrate.

Figure 10:
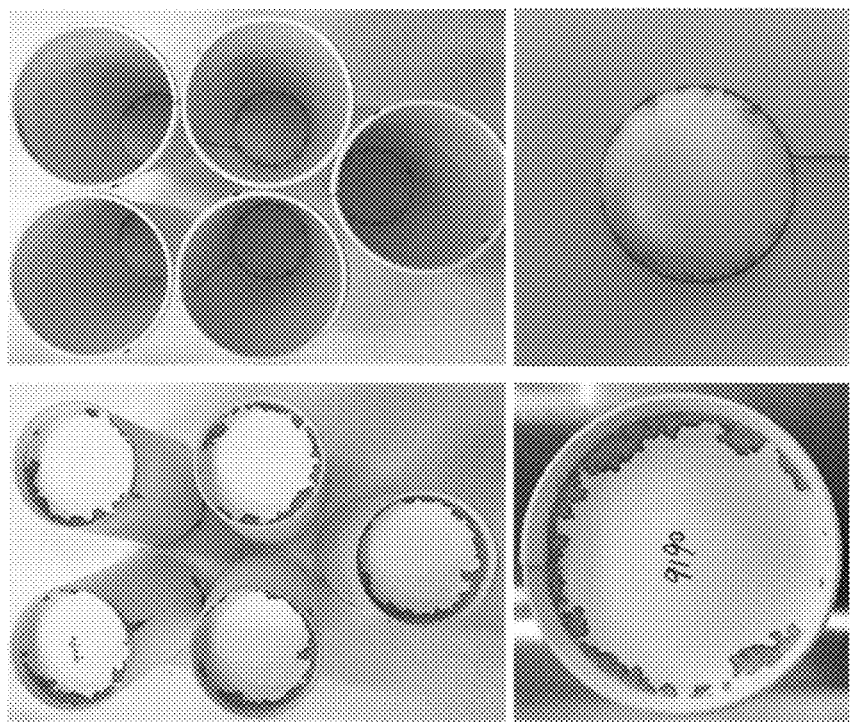
FIG. 10 includes photographs of several control cups having cup bottoms comprising a water barrier (2-layer) coated paperboard.

Referring to FIG. 10, photographs were taken to show five BS-control cups having cup bottoms comprising a water barrier (2-layer) coated paperboard without an oil barrier layer. These cups were subjected to hot coffee with additional creamer. The bottom two panels of FIG. 10 show a magnified view of one cup from the two top panels. All BS-control cups tested showed internal coffee staining spots along the fold edge of the cup bottom and heavy external staining at the cup bottom.

Figure 11:
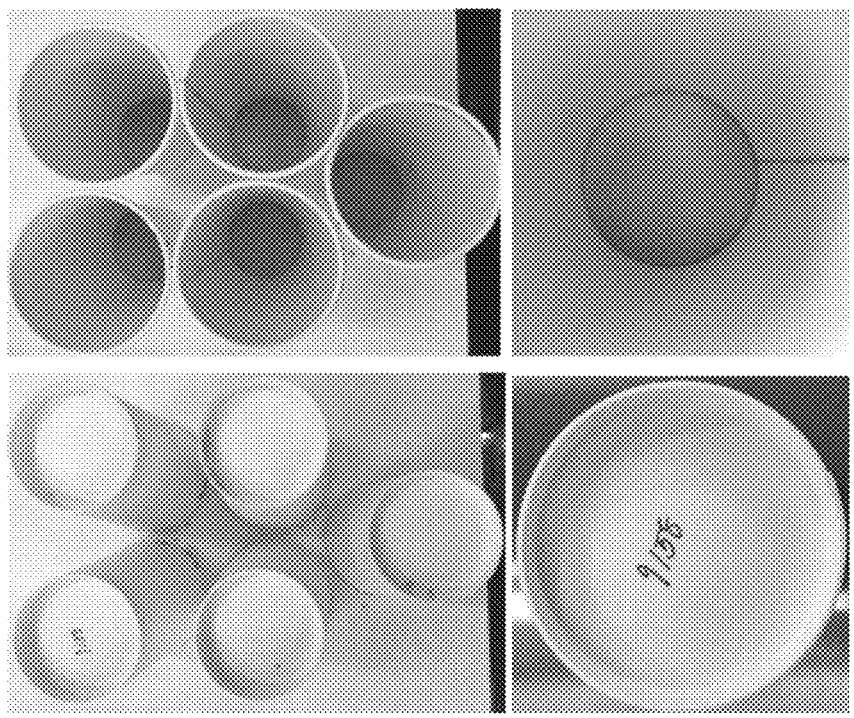
FIG. 11 includes photographs of several example cups having cup bottoms comprising a water barrier (2-layer) and an oil barrier layer coated paperboard.

Referring to FIG. 11, photographs were taken to show five cups having cup bottoms comprising a water barrier (1-layer) over a Na CMC oil barrier layer coated paperboard. These cups were subjected to hot coffee with additional creamer. The bottom two panels of FIG. 10 show a magnified view of one cup from the two top panels. All cups showed coffee staining on the internal fold edge of the bottom wall, but very few staining spots on external side of the cup bottom. FIGS. 10 and 11 taken together demonstrate that the Na CMC oil barrier layer in addition to the water barrier layer can significantly reduce the amount of external staining of the fold edge on the cup bottom.

Although various examples of the disclosed coffee-stain resistant paperboard structures and associated containers and methods have been shown and described, modifications may occur to those skilled in the art upon reading the specification. The present application includes such modifications and is limited only by the scope of the claims.

What is claimed is:

1. A coffee stain-resistant cellulosic structure comprising:
  a cellulosic substrate comprising a first major side and a second major side opposed from the first major side;
  an oil barrier layer on the second major side of the cellulosic substrate, wherein the oil barrier layer is hydrophilic or water-soluble, wherein the oil barrier layer is a single layer, wherein the oil barrier layer consists of polyvinyl alcohol and optionally a pigment, wherein the oil barrier layer has a coat weight, on a dry basis, ranging from about 0.5 lb/3000 ft$^2$ to about 4 lb/3000 ft$^2$; and
  a water barrier layer directly on the oil barrier layer, wherein the water barrier layer comprises a binder and a pigment, wherein a ratio of the pigment to the binder in the water barrier layer is about 1:1.5 to about 1:6 by weight, wherein the binder comprises a water based acrylic emulsion polymer, wherein the water-based acrylic polymer emulsion has a glass transition temperature ranging from about 25° C. to about 50° C., wherein the pigment comprises at least one of clay and calcium carbonate, wherein the water barrier layer has a coat weight, on a dry basis, ranging from about 4 lb/3000 ft$^2$ to about 20 lb/3000 ft$^2$,
  wherein the cellulosic structure is folded in a direction of the first major side of the cellulosic substrate,
  wherein the cellulosic structure comprises microcracks in the water barrier layer at the folded portion of the cellulosic structure, wherein the microcracks form down to the oil barrier layer,
  wherein the cellulosic structure has a 30-minute-coffee-Cobb rating of at most about 30 g/m$^2$.

2. The coffee stain-resistant cellulosic structure of claim 1 wherein the oil barrier layer consists of the polyvinyl alcohol and the pigment, and wherein the pigment in the oil barrier layer comprises at least one of clay and calcium carbonate.

3. A cellulosic structure comprising:
  a cellulosic substrate comprising a first major side and a second major side opposed from the first major side, wherein the cellulosic substrate is folded in a direction of the first major side of the cellulosic substrate to form a fold edge;
  an oil barrier layer on the second major side of the cellulosic substrate, wherein the oil barrier layer is hydrophilic or water-soluble, wherein the oil barrier layer is a single layer, wherein the oil barrier layer consists of polyvinyl alcohol and optionally a pigment, wherein the oil barrier layer has a coat weight, on a dry basis, ranging from about 0.5 lb/3000 ft$^2$ to about 4 lb/3000 ft$^2$; and
  a water barrier layer directly on the oil barrier layer, wherein the water barrier layer comprises a binder and a pigment, wherein a ratio of the pigment to the binder in the water barrier layer is about 1:1.5 to about 1:6 by weight, wherein the binder comprises a water based acrylic emulsion polymer, wherein the water-based acrylic polymer emulsion has a glass transition temperature ranging from about 25° C. to about 50° C. wherein the pigment in the water barrier layer comprises at least one of clay and calcium carbonate, wherein the water barrier layer has a coat weight, on a dry basis, ranging from about 4 lb/3000 ft$^2$ to about 20 lb/3000 ft$^2$, wherein the cellulosic structure comprises microcracks in the water barrier layer at the fold edge, wherein the microcracks form down to the oil barrier layer.

4. The cellulosic structure of claim 3 wherein the cellulosic substrate comprises paperboard.

5. The cellulosic structure of claim 3 wherein the water barrier layer is a single layer.

6. The cellulosic structure of claim 3 wherein the water barrier layer comprises at least two layers.

7. The cellulosic structure of claim 3 wherein the oil barrier layer consists of the polyvinyl alcohol and the pigment, and wherein the pigment in the oil barrier layer comprises at least one of clay and calcium carbonate.

8. The cellulosic structure of claim 3 wherein the cellulosic structure has a 30-minute-coffee-Cobb rating of at most about 30 g/m$^2$.

9. The cellulosic structure of claim 3 having a 30-minute-water-Cobb rating of at most about 20 g/m$^2$.

10. A container comprising the cellulosic structure of claim 3.

11. A container comprising:
  a side wall having an upper end portion and a lower end portion; and
  a bottom wall connected to the lower end portion of the side wall,
  wherein at least the bottom wall comprises the cellulosic structure of claim 3.

12. The cellulosic structure of claim 4 wherein the paperboard comprises solid bleached sulfate.

13. The cellulosic structure of claim 3 wherein the oil barrier layer has a coat weight, on a dry basis, ranging from about 1 lb/3000 ft$^2$ to about 3 lb/3000 ft$^2$.

14. The cellulosic structure of claim 3 wherein the oil barrier layer has a coat weight, on a dry basis, ranging from about 1.5 lb/3000 ft$^2$ to about 2.5 lb/3000 ft$^2$.

15. The cellulosic structure of claim 3 wherein the water barrier layer has a coat weight, on a dry basis, ranging from about 6 lb/3000 ft$^2$ to about 16 lb/3000 ft$^2$.

16. The cellulosic structure of claim 3 having a 30-minute-water-Cobb rating of at most about 10 g/m$^2$.

17. The cellulosic structure of claim 3 having a 30-minute-water-Cobb rating of at most about 5 g/m$^2$.

* * * * *